(12) United States Patent
Lim (10) Patent No.: US 12,204,014 B2
(45) Date of Patent: Jan. 21, 2025

(54) ELECTRONIC DEVICE AND METHOD FOR PERFORMING RANGING THROUGH UWB COMMUNICATION

(71) Applicant: HYUNDAI MOBIS CO., LTD., Seoul (KR)

(72) Inventor: Jong Chul Lim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 211 days.

(21) Appl. No.: 17/894,766

(22) Filed: Aug. 24, 2022

(65) Prior Publication Data

US 2023/0204752 A1   Jun. 29, 2023

(30) Foreign Application Priority Data

Dec. 27, 2021   (KR) .......................... 10-2021-0188618

(51) Int. Cl.
| | | |
|---|---|---|
| *G01S 13/56* | (2006.01) | |
| *G01S 13/02* | (2006.01) | |
| *H04B 1/7163* | (2011.01) | |
| *B60R 25/24* | (2013.01) | |

(52) U.S. Cl.
CPC .......... *G01S 13/56* (2013.01); *G01S 13/0209* (2013.01); *H04B 1/7163* (2013.01); *B60R 25/245* (2013.01)

(58) Field of Classification Search
CPC ...... G01S 13/56; G01S 13/0209; G01S 7/023; G01S 5/0218; H04B 1/7163; B60R 25/245; B60R 25/01; B60R 25/10; B60R 25/24; H04W 72/0453; H04W 64/00; H04W 16/04; H04W 74/0875; H04W 4/023; H04W 76/36; H01Q 5/25
See application file for complete search history.

(56) References Cited

U.S. PATENT DOCUMENTS

| | | | |
|---|---|---|---|
| 10,127,815 B2* | 11/2018 | Hernandez | G08G 1/005 |
| 10,299,079 B1* | 5/2019 | Hurley | H04W 4/08 |
| 11,695,447 B2* | 7/2023 | Parthasarathi | H04B 7/0602 |
| | | | 375/140 |
| 2009/0003251 A1 | 1/2009 | Imae | |
| 2016/0295589 A1 | 10/2016 | Nikopour et al. | |
| 2019/0373621 A1 | 12/2019 | Jiang et al. | |

FOREIGN PATENT DOCUMENTS

KR   10-2021-0137840 A   11/2021

OTHER PUBLICATIONS

Extended European Search Report Issued on May 11, 2023, in Counterpart Korean Patent Application No. 22185345.0 (9 Pages in English).

* cited by examiner

*Primary Examiner* — Vineeta S Panwalkar
(74) *Attorney, Agent, or Firm* — NSIP Law (57) ABSTRACT

The present disclosure relates to an electronic device and a method for performing ranging through a UWB communication including receiving state information of each of moving nodes occupying channels provided by anchor nodes in a UWB communication area to perform ranging on the anchor nodes, setting priorities of the moving nodes based on the state information, and recovering one of the channels occupied by the moving nodes based on each of the priority.

18 Claims, 5 Drawing Sheets

FIG. 5

ELECTRONIC DEVICE AND METHOD FOR PERFORMING RANGING THROUGH UWB COMMUNICATION

CROSS-REFERENCE TO RELATED APPLICATION

This application claims the benefit under 35 USC § 119(a) of Korean Patent Application No. 10-2021-0188618, filed on Dec. 27, 2021, the entire disclosure of which are incorporated herein by reference for all purposes.

BACKGROUND

Field

Exemplary embodiments of the present disclosure relate to an electronic device and a method for performing ranging through Ultra-Wide Band (UWB) communication.

Description of Related Art

A smart key system is a system that allows opening or closing of vehicle doors and externally starting a vehicle without inserting, by a driver, a separate key into a vehicle's key box or performing any special manipulation for operation. The smart key system is operated by ranging a smart key through wireless communication such as an Ultra-Wide Band (UWB) communication, and in addition to a fob key, various electronic apparatuses, which support wireless communication, such as smartphones, wearable devices, tablet personal computers (PCs), etc. can be used as smart keys.

Meanwhile, in general, the number of smart keys that can simultaneously perform ranging through the smart key system is limited. Accordingly, when a new smart key is detected while the smart key system performs ranging on all smart keys that can simultaneously perform ranging, in order to perform ranging on the new smart key entering the communication area, one of the smart keys that perform ranging should be selected to be disconnected from the ranging, but there is a problem in that the new smart key cannot perform smoothly ranging due to lack of a disconnection criterion for selecting the smart key.

The related art of the present disclosure is disclosed in Korean Patent Application No. 10-2021-0137840 published on Nov. 18, 2021 and entitled "UWB System".

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of operating electronic device for performing ranging through Ultra-Wide Band (UWB) communication including receiving state information of each of moving nodes occupying channels provided by anchor nodes in a UWB communication area to perform ranging on the anchor nodes, setting priorities of the moving nodes based on the state information, and recovering one of the channels occupied by the moving nodes based on each of the priority.

The setting of the priorities may include identifying, by the anchor nodes, a moving node on which ranging has never been performed from among the moving nodes occupying the channels as a first moving node, and setting a priority of the first moving node to be lower than priorities of other moving nodes.

The setting of the priorities may include identifying a moving node on which ranging is performed by the anchor nodes from among the moving nodes occupying the channels as a second moving node, and setting a priority of the second moving node to be higher than priorities of other moving nodes.

The setting of the priorities may include calculating a number of ranging anchors that is the number of anchor nodes performing ranging on the second moving node, and setting a priority between the second moving nodes based on the number of ranging anchors.

The setting of the priorities between the second moving nodes may include setting a priority of moving node having a larger number of the ranging anchors to be higher than a priority of moving node having a smaller number of the ranging anchors.

The method may include identifying moving nodes other than the first and second moving nodes among the moving nodes occupying the channels as third moving nodes, calculating a number of expired anchors, which is the number of anchor nodes that ranging has stopped because ranging is not performed for a time period while ranging is performed on the third moving node, and setting a priority between the third moving nodes based on the number of expired anchors.

The setting of the priority between the third moving nodes may include setting a priority of the moving node having a larger number of expired anchors to be lower than a priority of the moving node having a smaller number of expired anchors.

The recovering may include recovering a channel being occupied by the moving node set to a lowest priority.

The recovering may be performed, in response to a new moving node being detected in the UWB communication area while all of the channels are occupied by the moving nodes.

In another general aspect, there is provided an electronic device for performing ranging through Ultra Wide Band (UWB) communication including a communication module configured to communicate with anchor nodes provided in a UWB communication area, and a processor configured to receive state information of each of moving nodes occupying channels provided by the anchor nodes to perform ranging on the anchor nodes through the communication module, set a priorities of the moving nodes based on the state information, and recover one of the channels occupied by the moving nodes based on each of the priorities.

The processor may be configured to identify a moving node on which ranging has never been performed from among the moving nodes occupying the channels as a first moving node, and to set a priority of the first moving node to be lower than priorities of other moving nodes.

The processor may be configured to identify a moving node on which ranging is performed by the anchor nodes from among the moving nodes occupying the channels as a second moving node, and to set a priority of the second moving node to be higher than priorities of other moving nodes.

The processor may be configured to calculate a number of ranging anchors that is the number of anchor nodes performing ranging on the second moving node, and to set a priority between the second moving nodes based on the number of ranging anchors.

The processor may be configured to set a priorities of moving node having a larger number of ranging anchors to be higher than a priority of moving nodes having a smaller number of ranging anchors.

The processor may be configured to identify moving nodes other than the first and second moving nodes among the moving nodes occupying the channels as third moving nodes, to calculate a number of expired anchors that is the number of anchor nodes that are not ranging for a time period while ranging is performed on the third moving node, and to set the priority between the third moving nodes based on the number of expired anchors.

The processor may be configured to sets a priority of moving nodes having a larger number of expired anchors to be lower than a priority of moving nodes having a smaller number of expired anchors.

The processor may be configured to recovers the channel being occupied by the moving node set to a lowest priority.

The processor may be configured to recover one of the channels, in response to a new moving node being detected in the UWB communication area while all of the channels are occupied by the moving nodes.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION OF THE ILLUSTRATED EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Although terms such as "first," "second," and "third," A, B, C, (a), (b), (c), or the like may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Throughout the specification, when a component is described as being "connected to," "coupled to," or "joined" another component, it may be directly "connected to," "coupled to," or "joined" the other component, or there may be one or more other components intervening therebetween. In contrast, when an element is described as being "directly connected to," or "directly coupled to," or "directly joined" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an electronic device and a method for performing ranging through Ultra-Wide Band (UWB) communication will be described below with reference to the accompanying drawings through various exemplary embodiments.

For clarity and convenience in description, thicknesses of lines, sizes of constituent elements, and the like may be illustrated in an exaggerated manner in the drawings. In addition, terms described below are defined by considering functions according to the present disclosure and may vary according to the intention of a user or a manager or according to the common practices in the art. Therefore, definitions of the terms should be defined in light of details disclosed throughout the present specification.

Figure 1:
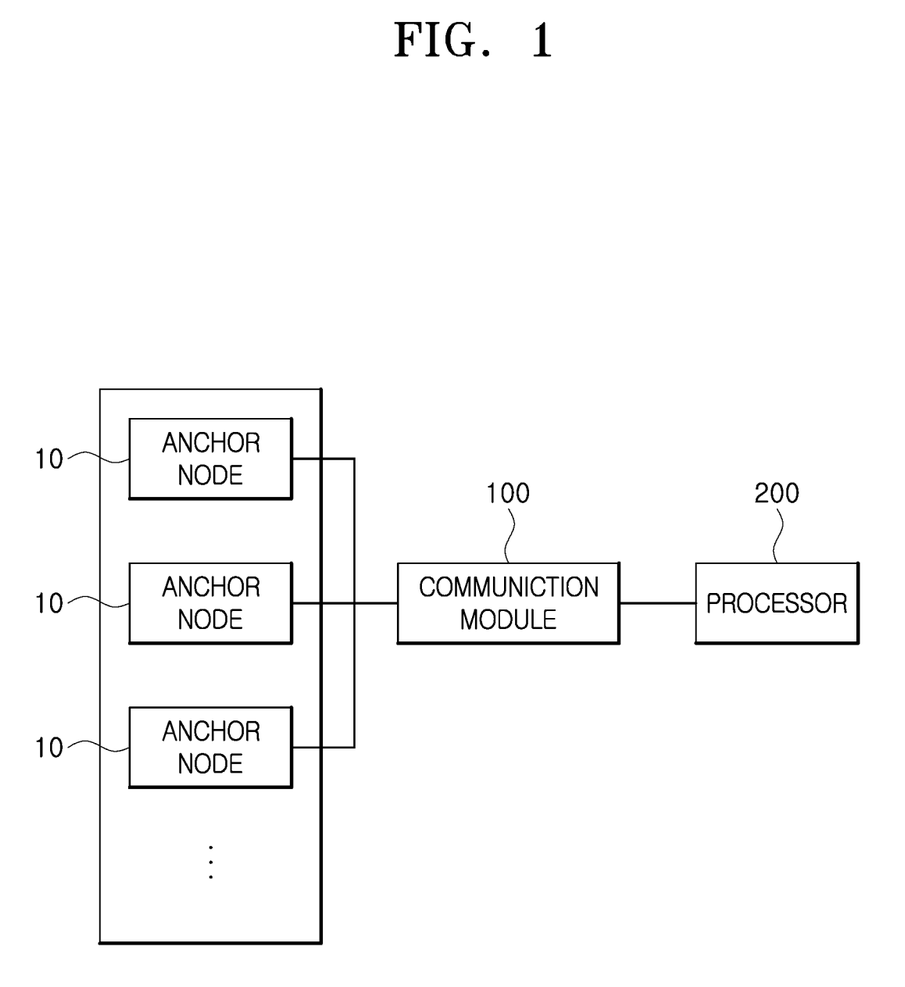
FIG. 1 is a block diagram illustrating an electronic device that performs ranging through Ultra-Wide Band (UWB) communication according to an embodiment of the present disclosure.
Figure 2:
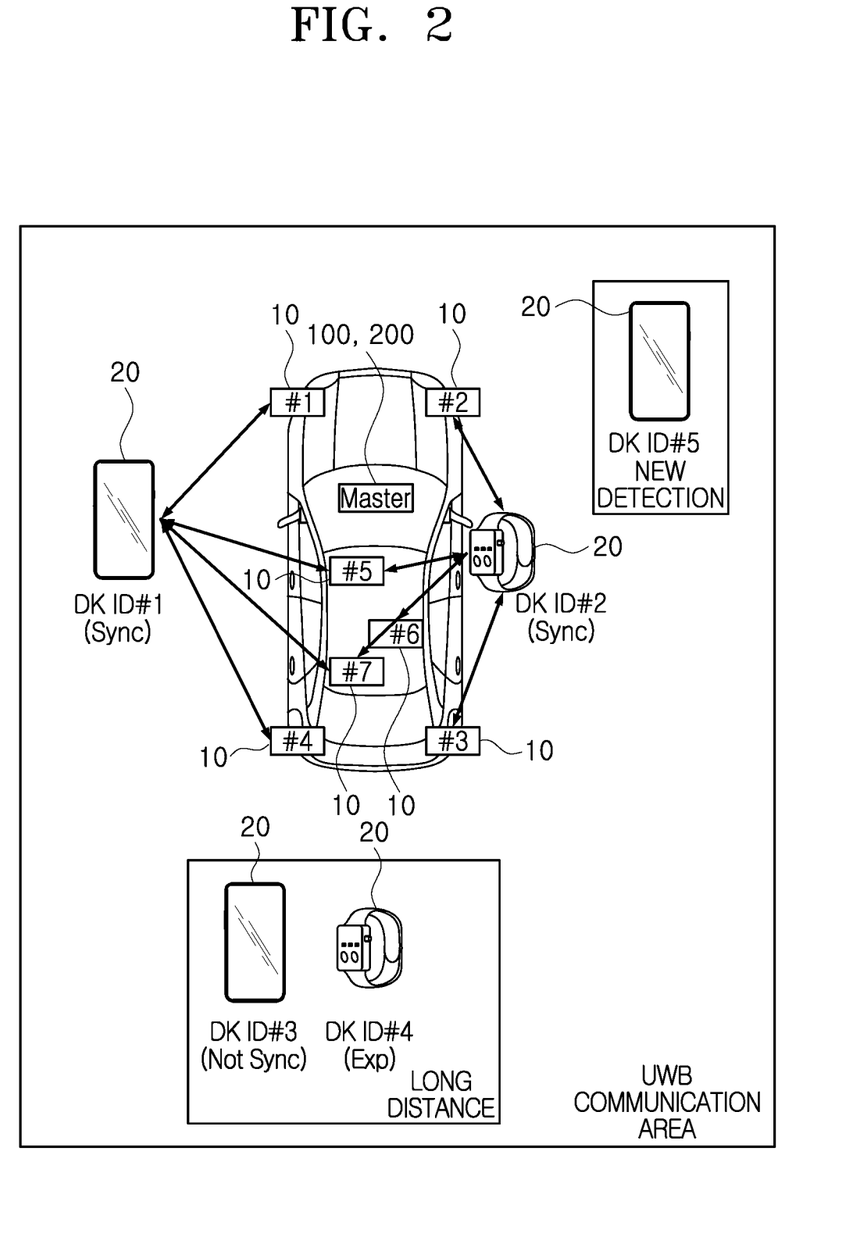
FIG. 2 is an exemplary diagram illustrating a vehicle to which the electronic device for performing ranging through UWB communication according to the embodiment of the present disclosure is applied.

FIG. 1 is a block diagram illustrating an electronic device that performs ranging through UWB communication according to an embodiment of the present disclosure. FIG. 2 is an exemplary diagram illustrating a vehicle to which the electronic device for performing ranging through UWB communication according to the embodiment of the present disclosure is applied.

Referring to FIGS. 1 and 2, the electronic device for performing ranging through UWB communication according to the embodiment of the present disclosure may include a communication module 100 and a processor 200.

The communication module 100 may communicate with a plurality of anchor nodes 10 provided in a predefined UWB communication area. The plurality of anchor nodes 10 may be provided to be spaced apart from each other in the UWB communication area. The anchor node 10 may be an anchor that performs communication through UWB communication. The anchor node 10 may perform ranging on a moving node 20 located in the UWB communication area. The ranging may mean an operation in which the anchor node 10 measures a position of the moving node 20. The moving node 20 may include an electronic device capable of performing communication through UWB communication. For example, the moving node 20 may be a smartphone, a tablet, personal computer (PC), a wearable device, or the like. Referring to FIG. 2, the plurality of anchor nodes 10 may be provided to space apart from each other inside the vehicle, and may perform ranging on the moving node 20 such as a smartphone, a tablet, a wearable device, or the like operated by a digital key.

The processor 200 may receive state information of each moving node 20 occupying channels provided by the plurality of anchor nodes 10 to perform ranging on the plurality of anchor nodes 10 through the communication module 100.

Herein, the channel may have a time-division concept of a wireless communication path connecting the anchor node 10 and the moving node 20. That is, the channel may be a communication time between the anchor node 10 and an anchor node 10 assigned to each of the moving nodes 20 for performing ranging. The number of moving nodes 20 with which the anchor node 10 may communicate, that is, the number of channels, is limited. Channels of the plurality of anchor nodes 10 may be synchronized with each other. That is, the channel of each anchor node 10 may be occupied by the same moving node 20. For example, when a first moving node occupies a channel of a first anchor node, the first moving node also occupies a channel of the anchor node other than the first anchor node.

Meanwhile, the state information may be a state of each moving node 20 occupying a channel provided by the anchor node 10. The state of the moving node 20 may be divided into a state in which ranging is attempted by the anchor node 10 but has never performed (hereinafter, Not Sync), a state in which ranging is performed by the anchor node 10 (hereinafter, Sync), and a state in which ranging is stopped (hereinafter, Expiration) because ranging is not performed for a predetermined time (when ranging fails for a predetermined time, the anchor may stop ranging of a corresponding moving node by itself to minimize power consumption). For example, assuming that an anchor node A performs ranging on moving nodes a and b, attempts ranging on a moving node c, and has stopped ranging from a moving node d, the anchor node A may transmit state information including the moving nodes a and b: Sync, the moving node c: Not Sync, and the moving node d: Expiration.

The processor 200 may set a priority between the moving nodes 20 occupying a channel based on a state information of the moving node 20 received from each of the plurality of anchor nodes 10. The processor 200 may indirectly estimate a degree to which the moving node 20 is spaced apart from a center of the UWB communication area through the state information of the moving node 20 received from each of the plurality of anchor nodes 10, or may indirectly determine an approach intention of the moving node 20, and may set the priority between the moving nodes 20 using an estimated or determined result.

According to an embodiment, the processor 200 may identify the moving node 20, on which ranging has never performed by the anchor node 10, among the moving nodes 20 occupying the channel as the first moving node, and may set the priority of the first moving node 20 lower than the priorities of other moving nodes 20. That is, the processor 200 may set the priority of the moving node 20 in which all state information received from the plurality of anchor nodes 10 is Not Sync to be the lowest. For example, referring to FIG. 2, a priority of the moving nodes 20 (#3) in which state information received from all of a plurality of anchor nodes 10 is Not Sync may be set to be lower than priorities of other moving nodes 20 (#1, #2, and #4).

According to an embodiment, the processor 200 may identify the moving node 20 on which ranging is performed by one or more anchor nodes 10 among the moving nodes 20 occupying the channel as the second moving node, and may set the priority of the second moving node 20 higher than the priorities of other moving nodes 20. That is, the processor 200 may set a priority of the moving node 20 in which any Sync state information is received to be higher than a priority of the moving node 20 in which any Sync state information is not received. For example, referring to FIG. 2, the priorities of the moving nodes 20 (#1 and #2) on which ranging is performed by one or more anchor nodes 10 may be set to be higher than the priorities of the moving nodes 20 (#3 and #4) on which ranging is not performed.

According to an embodiment, the processor 200 may calculate the number of ranging anchors that is the number of anchor nodes 10 that perform ranging on the second moving node with respect to each of the second moving nodes, and may set a priority between the second moving nodes based on a calculated number of ranging anchors. According to an embodiment, the processor 200 may set a priority of the moving node 20 having a relatively large number of ranging anchors to be higher than a priority of the moving node 20 having a relatively small number of ranging anchors. That is, the processor 200 may determine that user's access and use intention are higher as the number of ranging anchors increases, and may set the priority of a corresponding moving node 20 to be high. For example, referring to FIG. 2, when the total number of anchor nodes 10 is 7, the processor 200 may set the priority of the moving node 20 (#1) having four anchor nodes 10 that perform ranging on the moving node 20 (#1) lower than the priority of the moving node 20 (#2) having five anchor nodes 10 that perform ranging on the moving node 20 (#2). The processor 200 may calculate the number of ranging anchors for each of the second moving nodes based on the state information received from each anchor node 10.

According to an embodiment, the processor 200 may identify the moving nodes 20 excluding the first and second moving nodes among the moving nodes 20 occupying the channel as third moving nodes, calculate the number of expired anchors that are the number of anchor nodes 10 that have stopped ranging because ranging is not performed for a predetermined time while ranging is performed on the third moving node with respect to each of the third moving nodes, and may set a priority between the third movement nodes based on the calculated number of expired anchors. According to an embodiment, the processor 200 may set the priority of the moving node 20 having a relatively large number of expired anchors to be lower than the priority of the moving node 20 having a relatively small number of expired anchors. That is, the processor 200 determines that the user's access and use intention are lower as the number of expired anchors increases, and thus may set the priority of a corresponding moving node 20 to be low. For example, when the total number of anchor nodes 10 is 7, the processor 200 may set the priority of the moving nodes 20 having five number of anchor nodes 10 that is stopped ranging because ranging is not performed for a predetermined time while ranging is performed on the moving nodes 20 to be lower than the priority of the moving nodes 20 having three number of anchor nodes 10 that is stopped ranging because ranging is not performed for a predetermined time while ranging is performed on the moving nodes 20. The processor 200 may calculate the number of expired anchors for each of the third moving nodes based on the state information received from each anchor node 10.

The processor 200 may recover one of channels being occupied by the moving node 20 based on the set priority. According to an embodiment, the processor 200 may recover a channel being occupied by the moving node 20 set to the lowest priority.

The processor 200 may recover one of channels when a new moving node 20 is detected in the UWB communication area while channels are all occupied by the moving node 20.

As described above, when a new electronic apparatus is detected while all channels supported by an anchor provided in a UWB communication area are occupied, one of channels is efficiently selected and recovered, and the recovered channel is assigned to a newly detected electronic apparatus, thereby the present disclosure can smoothly perform ranging on the newly detected electronic apparatus.

Figure 3:
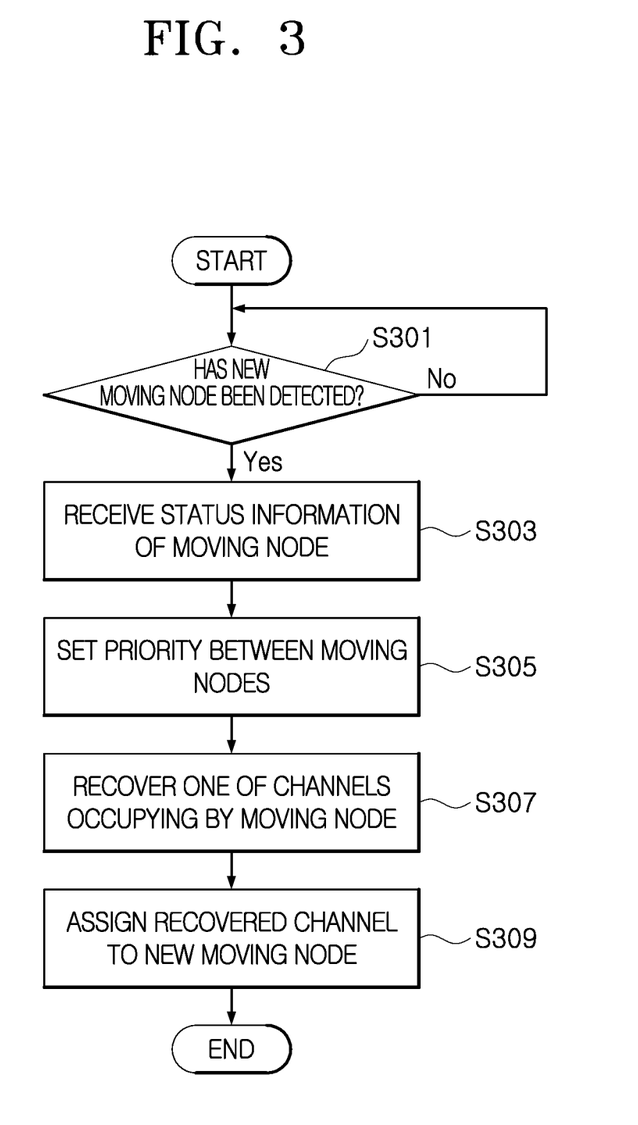
FIGS. 3 to 5 are flowcharts illustrating a method of operating an electronic device that performs ranging through UWB communication according to an embodiment of the present disclosure.

FIG. 3 is a first flowchart illustrating a method of operating an electronic device that performs ranging through UWB communication according to an embodiment of the present disclosure.

Hereinafter, a process in which the processor 200 recovers a channel being occupied by the moving node 20 and assigns the channel to a new moving node 20 will be described with reference to FIG. 3.

First, the processor 200 may determine whether the new moving node 20 is detected in the UWB communication area (S301). The processor 200 may detect the moving node 20 through a plurality of anchor nodes 10 provided in the UWB communication area.

When the new moving node 20 is detected in the UWB communication area, the processor 200 may receive state information of the moving node 20 occupying a channel provided by the anchor node 10 from a plurality of anchor nodes 10 provided in the UWB communication area (S303).

Subsequently, the processor 200 may set a priority between the moving nodes 20 occupying the channel based on the state information of the moving node 20 received from the plurality of anchor nodes 10 (S305). A detailed process of setting, by the processor 200, a priority between the moving nodes 20 will be described below.

Subsequently, the processor 200 may recover one of channels being occupied by the moving node 20 based on a set priority (S307). The processor 200 may recover a channel being occupied by the moving node 20 set to the lowest priority.

Subsequently, the processor 200 may assign a recovered channel to a new moving node 20 (S309).

Meanwhile, the processor 200 may assign a channel to the new moving node 20 and set a priority between the moving nodes 20 occupying the channel again, and may recover the channel assigned to the new moving node 20 and reassign the channel to the recovered moving node 20 when the priority of the new moving node 20 is lower than the priority of the moving node 20 from which the channel has recovered.

In the above-described embodiment, steps S303 and S305 are described as being performed after step S301, but steps S303 and S305 may be performed before step S301. That is, the processor 200 sets a priority between the moving nodes 20 before the new moving node 20 is detected, recovers a channel according to the priority in response to the detection of the new moving node 20, and may assign the recovered channel to the new moving node 20. In this case, the processor 200 may set the priority between the moving nodes 20 at a preset period.

Figure 4:
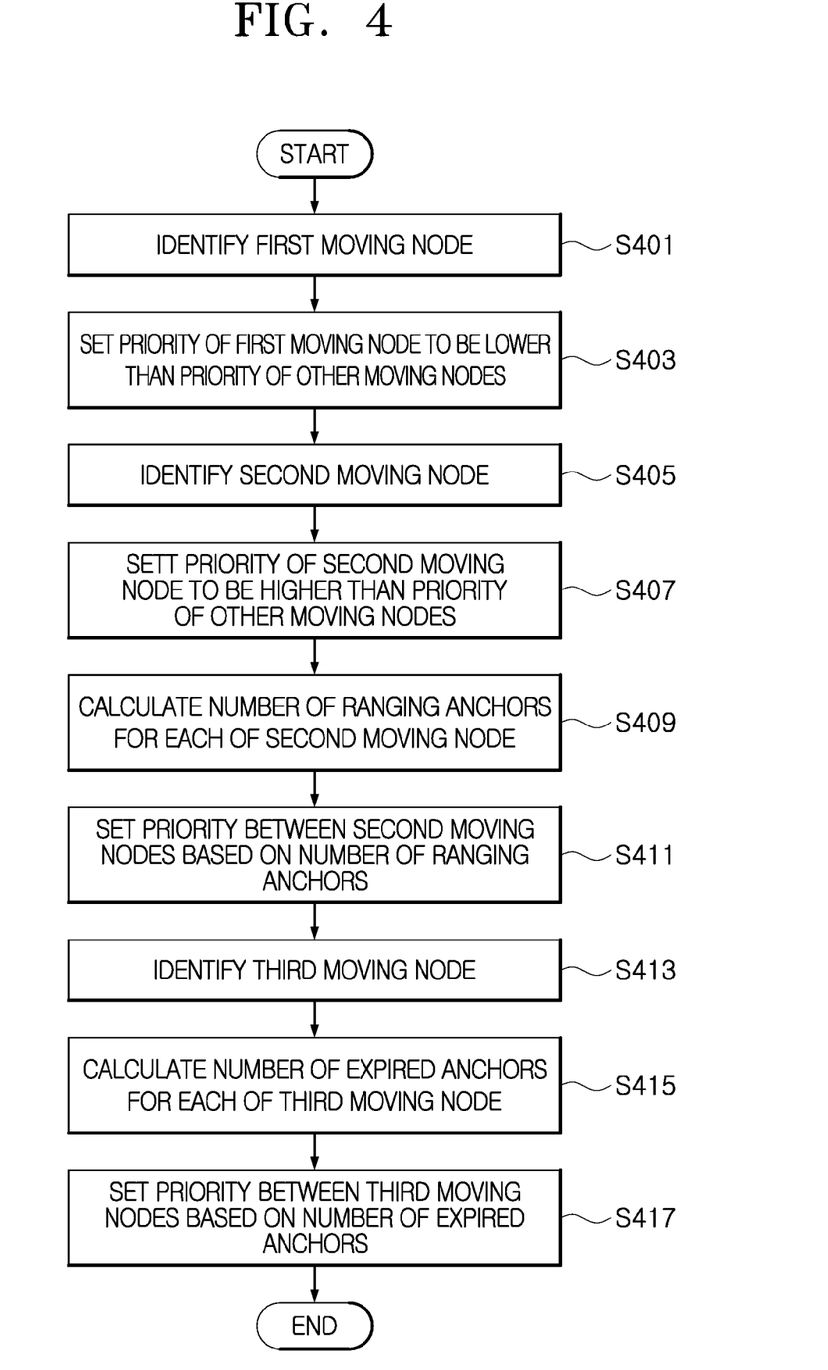

FIG. 4 is a second flowchart illustrating a method of operating an electronic device that performs ranging through UWB communication according to an embodiment of the present disclosure.

Hereinafter, a process in which the processor 200 sets a priority between the moving nodes 20 occupying the channel will be described with reference to FIG. 4.

First, the processor 200 may identify the moving node 20 on which ranging has never performed by the anchor node 10 among the moving nodes 20 occupying the channel as a first moving node (S401).

Subsequently, the processor 200 may set a priority of the first moving node to be lower than priorities of other moving nodes 20 (S403).

Subsequently, the processor 200 may identify the moving node 20 on which ranging is performed by one or more anchor nodes 10 among the moving nodes 20 occupying the channel as a second moving node (S405).

Subsequently, the processor 200 may set a priority of the second moving node to be higher than priorities of other moving nodes 20 (S407).

Subsequently, the processor 200 may calculate the number of ranging anchors for each of the second moving nodes (S409).

Subsequently, the processor 200 may set a priority between the second moving nodes based on the number of ranging anchors (S411). The processor 200 may set a higher priority as the number of ranging anchors increases. For example, assuming that the total number of anchor nodes 10 included in the UWB communication area is 7, the processor 200 may set a priority of the moving node 20 having 7 ranging anchors to be higher than the priority of the moving node 20 having 6 ranging anchors.

Subsequently, the processor 200 may identify the moving nodes 20 excluding the first and second moving nodes among the moving nodes 20 occupying the channels as third moving nodes (S413). That is, the processor 200 may identify the moving node 20, on which ranging is not performed by the anchor node 10 but has performed at least once or more, as the third moving node.

Subsequently, the processor 200 may calculate the number of expired anchors for each of the third moving nodes (S415).

Subsequently, the processor 200 may set a priority between the third moving nodes based on the number of expired anchors (S417). The processor 200 may set a higher priority as the number of expired anchors decreases. For example, assuming that the total number of anchor nodes 10 included in the UWB communication area is 7, the processor 200 may set the priority of the moving node 20 having 0 expired anchor to be higher than the priority of the moving node 20 having 1 expired anchor.

Figure 5:
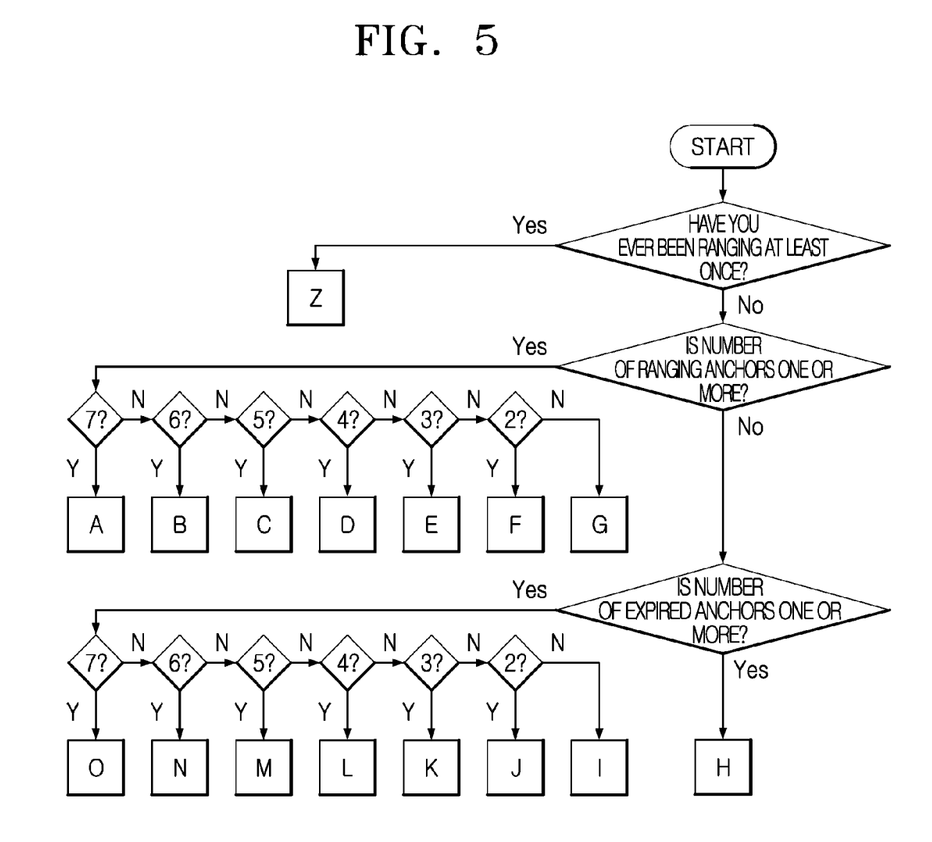

FIG. 5 is a third flowchart illustrating a method of operating an electronic device that performs ranging through UWB communication according to an embodiment of the present disclosure.

Hereinafter, a process of setting a priority of each moving node 20 in a case where seven anchor nodes 10 are totally provided will be described with reference to FIG. 5.

First, the processor 200 may determine whether ranging has ever performed on a target moving node 20 by the anchor node 10.

When it is determined that ranging has not performed on the target moving node 20 by the anchor node 10, the processor 200 may set a priority of the target moving node 20 to Z which is the lowest priority.

On the other hand, when it is determined that ranging has performed on the target moving node 20 by the anchor node 10 even once, the processor 200 may determine whether the number of anchor nodes 10 ranging the target moving node 20 is one or more.

When it is determined that the number of anchor nodes 10 performing ranging on the target moving node 20 is one or more, the processor 200 may set the priority of the target moving node 20 according to the number of anchor nodes 10 (the number of ranging anchors) performing ranging on the target moving node 20.

The processor 200 may set the priority of the target moving node 20 to A which is the highest priority when the number of ranging anchors is 7, the processor 200 may set the priority of the target moving node 20 to B which is one lower level than A when the number of ranging anchors is 6, the processor 200 may set the priority of the target moving node 20 to C which is one lower level than B when the number of ranging anchors is 5, the processor 200 may set the priority of the target moving node 20 to D which is one lower level than C when the number of ranging anchors is 4, the processor 200 may set the priority of the target moving node 20 to E which is one lower level than D when the number of ranging anchors is 3, the processor 200 may set the priority of the target moving node 20 to F which is one lower level than E when the number of ranging anchors is 2, and the processor 200 may set the priority of the target moving node 20 to G which is one lower level than F when the number of ranging anchors is 1.

Meanwhile, when it is determined that the number of anchor nodes 10 performing ranging on the target moving node 20 is not one or more, the processor 200 may set the priority of the target moving node 20 according to the number of anchor nodes 10 (the number of expired anchors) that have stopped the ranging because ranging is not performed for a predetermined time.

The processor 200 may set the priority of the target moving node 20 to H which is one lower level than G when the number of expired anchors is 0, the processor 200 may set the priority of the target moving node 20 to I which is one lower level than H when the number of expired anchors is 1, the processor 200 may set the priority of the target moving node 20 to J which is one lower level than I when the number of expired anchors is 2, the processor 200 may set the priority of the target moving node 20 to K which is one lower level than J when the number of expired anchors is 3, the processor 200 may set the priority of the target moving node 20 to L which is one lower level than J when the number of expired anchors is 4, the processor 200 may set the priority of the target moving node 20 to M which is one lower level than L when the number of expired anchors is 5, the processor 200 may set the priority of the target moving node 20 to N which is one lower level than M when the number of expired anchors is 6, and the processor 200 may set the priority of the target moving node 20 to O which is one lower level than N when the number of expired anchors is 7.

As described above, an electronic device and a method for performing ranging through UWB communication according to an embodiment of the present disclosure may efficiently select and recover one of channels being occupied, and assign the recovered channel to a newly sensed electronic apparatus, thereby smoothly performing ranging on the newly detected electronic apparatus when all channels supported by an anchor provided in a UWB communication area are occupied and the new electronic apparatus is detected.

As described above, an electronic device and a method for performing ranging through Ultra-Wide Band (UWB) communication is disclosed, and when a new electronic apparatus is detected while all channels supported by an anchor provided in a UWB communication area are occupied, the electronic device and method are capable of efficiently selecting and recovering one of the channels being occupied and assigning the recovered channel to the newly detected electronic apparatus.

As described above, when all channels supported by an anchor provided in a UWB communication area are occupied and a new electronic apparatus is detected, an electronic device and a method for performing ranging through UWB communication can efficiently select and recover one of the channels being occupied and assign the recovered channel to the newly sensed electronic apparatus, thereby smoothly performing ranging on the newly detected electronic apparatus.

The controller 200, and other apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner. In an example, the processor also includes a communication apparatus, such as a computer, a cellular phone, a portable/personal digital assistant (PDA), and other devices which facilitate information communication between end users.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

The Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the method described herein. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of operating an electronic device to perform ranging through Ultra-Wide Band (UWB) communication, the method comprising:
   receiving state information of each of moving nodes occupying channels provided by anchor nodes in a UWB communication area to perform ranging on the anchor nodes;
   setting priorities of the moving nodes based on the state information; and
   recovering one of the channels occupied by the moving nodes based on each of the priorities.

2. The method of claim 1, wherein the setting of the priorities comprises:
   identifying, by the anchor nodes, a moving node on which ranging has never been performed from among the moving nodes occupying the channels as a first moving node; and
   setting a priority of the first moving node to be lower than priorities of other moving nodes.

3. The method of claim 2, wherein the setting of the priorities comprises:
   identifying a moving node on which ranging is performed by the anchor nodes from among the moving nodes occupying the channels as a second moving node; and
   setting a priority of the second moving node to be higher than priorities of other moving nodes.

4. The method of claim 3, wherein the setting of the priorities comprises:
   calculating a number of ranging anchors that is the number of anchor nodes performing ranging on the second moving node; and
   setting a priority between the second moving nodes based on the number of ranging anchors.

5. The method of claim 4, wherein the setting of the priorities between the second moving nodes comprises setting a priority of a moving node having a larger number of the ranging anchors to be higher than a priority of a moving node having a smaller number of the ranging anchors.

6. The method of claim 3, wherein the setting of the priorities comprises:
   identifying moving nodes other than the first and second moving nodes among the moving nodes occupying the channels as third moving nodes;
   calculating a number of expired anchors, which is the number of anchor nodes where ranging has stopped because ranging is not performed for a time period while ranging is performed on the third moving node; and
   setting a priority between the third moving nodes based on the number of expired anchors.

7. The method of claim 6, wherein the setting of the priority between the third moving nodes comprises setting a priority of the moving node having a larger number of expired anchors to be lower than a priority of the moving node having a smaller number of expired anchors.

8. The method of claim 1, wherein the recovering comprises recovering a channel being occupied by the moving node set to a lowest priority.

9. The method of claim 1, wherein the recovering is performed, in response to a new moving node being detected in the UWB communication area while all of the channels are occupied by the moving nodes.

10. An electronic device that performs ranging through Ultra Wide Band (UWB) communication, the electronic device comprising:
    a communication circuit configured to communicate with anchor nodes provided in a UWB communication area; and
    a processor configured to:
       receive state information of each of moving nodes occupying channels provided by the anchor nodes to perform ranging on the anchor nodes through the communication circuit,
       set a priorities of the moving nodes based on the state information, and
       recover one of the channels occupied by the moving nodes based on each of the priorities.

11. The electronic device of claim 10, wherein the processor is further configured to identify a moving node on which ranging has never been performed from among the moving nodes occupying the channels as a first moving node, and to set a priority of the first moving node to be lower than priorities of other moving nodes.

12. The electronic device of claim 11, wherein the processor is further configured to identify a moving node on which ranging is performed by the anchor nodes from among the moving nodes occupying the channels as a second moving node, and to set a priority of the second moving node to be higher than priorities of other moving nodes.

13. The electronic device of claim 12, wherein the processor is further configured to calculate a number of ranging anchors that is the number of anchor nodes performing ranging on the second moving node, and to set a priority between the second moving nodes based on the number of ranging anchors.

14. The electronic device of claim 13, wherein the processor is further configured to set a priority of moving nodes having a larger number of ranging anchors to be higher than a priority of moving nodes having a smaller number of ranging anchors.

15. The electronic device of claim 12, wherein the processor is further configured to identify moving nodes other than the first and second moving nodes among the moving nodes occupying the channels as third moving nodes, to calculate a number of expired anchors that is the number of anchor nodes that are not ranging for a time period while ranging is performed on the third moving node, and to set the priority between the third moving nodes based on the number of expired anchors.

16. The electronic device of claim 15, wherein the processor is further configured to set a priority of moving nodes having a larger number of expired anchors to be lower than a priority of moving nodes having a smaller number of expired anchors.

17. The electronic device of claim 10, wherein the processor is further configured to recover the channel being occupied by the moving node set to a lowest priority.

18. The electronic device of claim 10, wherein the processor is further configured to recover one of the channels, in response to a new moving node being detected in the UWB communication area while all of the channels are occupied by the moving nodes.

\* \* \* \* \*